MEMORY ARRAY FOR TELEPHONE OFFICES

Filed Dec. 29, 1960 7 Sheets-Sheet 1

INVENTORS L. J. GITTEN
N. D. NEWBY
BY
S E Hollander
ATTORNEY

MAGNETIZATION CURVE OF THE TRANSFLUXOR

THE TRANSFLUXOR

"BLOCKED" TRANSFLUXOR

"UNBLOCKED" TRANSFLUXOR

MAGNETIZATION CURVE OF CORE SFC

SHUTTLE FLUX CORE

INVENTORS L. J. GITTEN
N. D NEWBY
BY
S E Hollander
ATTORNEY

INVENTORS L. J. GITTEN
N. D. NEWBY
BY S E Hollander
ATTORNEY

INVENTORS L. J. GITTEN
N. D. NEWBY
BY
S E Hollander
ATTORNEY

MEMORY ARRAY FOR TELEPHONE OFFICES

Filed Dec. 29, 1960 7 Sheets-Sheet 5

INVENTORS L. J. GITTEN
N D NEWBY
BY S E Hollander
ATTORNEY

INVENTORS L. J. GITTEN
N. D. NEWBY
BY
S E Hollander
ATTORNEY

MEMORY ARRAY FOR TELEPHONE OFFICES

Filed Dec. 29, 1960 7 Sheets-Sheet 7

INVENTORS L. J. GITTEN
N. D. NEWBY
BY S E Hollander
ATTORNEY

3,231,870
MEMORY ARRAY FOR TELEPHONE OFFICES

Lawrence J. Gitten, Forest Hills, N.Y., and Neal D. Newby, Leonia, N.J., assignors to Bell Telephone Laboratories, Incorporated, New York, N.Y., a corporation of New York Filed Dec. 29, 1960, Ser. No. 79,342
19 Claims. (Cl. 340—174)

This invention relates to memory arrays in telephone systems and more particularly to a one-bit memory per directory number magnetic core memory array in a telephone central office.

In the future, it may be necessary to provide new services which are not now available to a customer served by present telephone central offices. One such service might permit all calls to his station to be automatically intercepted for relatively short and frequent intervals as requested by the customer so that a specified announcement might be made to or an incoming message recorded from a calling party. Another type of service might permit all calls to his station during designated intervals to be automatically connected to some other specified station.

Some additional apparatus would be required in present offices if such services are to be provided. However, present equipment must know when access to this circuitry is necessary, i.e., a call requiring a new service must be "flagged," as by the inclusion of additional memory in existing offices.

Accordingly, it is an object of this invention to incorporate an added one-bit memory array in a telephone central office in a manner requiring a minimum of additional equipment.

It is another object of this invention to provide improved one-bit memory arrays.

It is another object of this invention to provide a one-bit memory array with nondestructive readout utilizing a single access circuit for both writing and reading operations.

A memory array, each element of which represents a particular subscriber, is incorporated in existing central offices in accordance with aspects of our invention. The central office equipment, before connecting the calling party to the called party, interrogates this array to determine whether or not a special service is to be provided for the particular called party. The memory array in accordance with our invention consists of one-bit memory elements whose state is an indication of whether or not the sequence of operations relating to the special service is to be initiated. Further, interrogation of the memory element representing the called party is nondestructive, i.e., the state of the element remains invariant in response to the interrogation though changeable by external control, as by an operator.

Two different one-bit magnetic core elements are incorporated in various embodiments of our invention. The first of these elements is the transfluxor described in the March, 1956, Proceedings of the I.R.E., by J. A. Rajchman and A. W. Lo on pages 321–332. The second of these magnetic cores is a ferrite structure utilizing shuttle flux switching for nondestructive readout and may be generally of the type described in E. A. Brown Patent 2,902,676, September 1, 1959.

The telephone system in which this invention is incorporated in the illustrative embodiments described herein is the No. 5 crossbar central office now in widespread use in this country. In accordance with another aspect of our invention the inclusion of the memory array requires a minimum of additional circuitry to the No. 5 crossbar and similar central offices.

Nondestructive arrays generally require two access circuits. In any memory array when it is desired to set or interrogate a particular element it is necessary to choose this element from the plurality of elements in the array. The means for accomplishing this end is generally termed an access circuit. The access circuit is in effect a translator whereby incoming information representing the particular core, most often in binary form, causes the particular conductor at the output of the translator which is connected to the desired memory element to be energized. If a single aperture magnetic core is utilized as the one-bit memory element the same access circuit may be used for both setting and interrogating operations. A particular conductor passes through the aperture of a single core. A common conductor passes through the aperture of each of the cores. If the state of any individual core is switched by the particular conductor, a voltage is induced in the common read-out winding. The interrogation pulse applied to any core is of a single polarity, which for example might set the core in the "one" state. To set the core in the "zero" state a pulse of the opposite polarity is applied to the particular conductor. Thus, if an individual core is in the "one" state the interrogation pulse does not cause the core to switch state and no output pulse is obtained. On the other hand, if the core is in the "zero" state the interrogation pulse switches the state of the core and an output pulse on the common read-out winding is obtained.

In such elementary arrays the read-out is destructive. If the core was previously in the "zero" state, after interrogation it is in the "one" state and the information represented by the core has been destroyed. If it is desired to maintain this information, as would be required in semi-permanent memories in telephone systems, the core must be reset to the "zero" state. There are known in the art many circuits which provide additional equipment to reset a core subsequent to interrogation if the read-out is destructive.

To avoid this additional equipment, nondestructive read-out memory elements have been devised in recent years. The transfluxor and shuttle flux cores are such examples. However, all such nondestructive read-out memory arrays have heretofore required at least two access circuits; the same winding has not been utilized for both setting and interrogating operations. While no additional circuitry for resetting the cores is required as in single aperture elements, an additional expense is incurred in providing for the extra access circuits.

The memory arrays of this invention utilizing transfluxor or shuttle flux cores, and associated with a No. 5 crossbar central office in the illustrative embodiments, have nondestructive read-out. In accordance with another aspect of our invention, they are arranged to require no access circuits other than those already found in the central office equipment and may, in certain embodiments, require only one access circuit.

In common control telephony systems there is generally no permanently prearranged association of subscriber directory numbers with subscriber equipment locations. A marker upon receiving the number for a terminating call must therefore ascertain which one of the many subset terminals in the office is associated with the particular directory number so that a connection may be established. In a No. 5 crossbar office the marker obtains this information from the number group frame. This frame, in a manner of speaking, is a large central file kept up to date with the latest directory number assignments to which each marker in turn applies for the necessary information asking, in effect, on which line-link frame and where on that line-link frame will the line corresponding to this directory number be found. After this information is received, the marker disconnects itself from the number group and proceeds to establish a connection to the called line. The operation of the number group frame is disclosed, inter alia, in an article by O. J. Morzenti in the Bell Laboratories Record of July, 1950, page 298. It is unnecessary for the purposes of this invention to describe this operation in great detail. It suffices to say that in the translation process three particular terminals representing the particular directory number called are connected to three pairs of relays each in a separate group of relays representing the associated equipment location by three jumpers called F, G and L leads. When a calling party dials the particular directory number these three pairs of distinct relays are operated. These relays, in turn, cause a potential to be placed upon various ones of many leads connected to the marker and provide the marker with the necessary information. There is a unique set of F, G and L leads associated with each subscriber, these leads being energized from the marker only upon the marker initiating the sequence of operations whereby a connection will be made to the subset of the called party.

In accordance with our invention, various ones of the F, G and L leads in the number group associated with each subscriber are wound around the associated magnetic core memory elements in the one-bit memory array of this invention. Thus, no additional access circuits are required, for a particular core is singled out automatically and interrogated by the marker each time a calling party desires to be connected to the subscriber. When it is desired to set a particular core it is merely necessary to cause the marker to initiate the sequence of operations necessary for a connection to be completed and then to apply appropriate currents for setting the core once the marker is connected to the number group. The marker is then stopped from completing the call so that the core may be set without disturbing the subscriber.

Further, only one of the F, G and L leads is necessary for both reading of and writing into cores of the memory array. Briefly, this is accomplished in our invention by realizing that in either the transfluxor or shuttle flux cores current pulses of varying magnitudes and polarities are required on the write and read windings for proper operation. By connecting these windings in series in such a manner that the write pulse of a specified magnitude and polarity effects switching of the magnetization state in that part of the core which is normally switched during the write operation, and the interrogation pulse of a second specified magnitude and polarity effects switching of the magnetization state in only that part of the core which is normally switched during the interrogation operation, the core is set and interrogated in the same manner as though the two windings were not connected. Thus, only one access circuit is required provided the current pulses applied are of the proper magnitude and polarity in both read and write operations.

It is a feature of our invention that a one-bit per directory number memory array be included in the number group of a common control telephone system for interrogation automatically by the marker circuit of the telephone system during the normal operation of the marker and number group circuits in establishing a connection through the telephone system.

It is another feature of our invention that the memory array include individual magnetic cores of a type having nondestructive read-out.

It is a further feature of our invention that the set, or write, and interrogate, or read, windings of a nondestructive read-out magnetic core be connected together so that a single access circuit only need be utilized for both read and write operations, the interconnection and the number of turns of the windings being such that the read and write operations are independent and distinct from each other.

It is still another feature of our invention that existing conductors in a common control telephone central office are utilized for connection to the magnetic cores of the memory array.

A complete understanding of these and other objects and features of this invention may be gained from consideration of the following detailed description together with the accompanying drawing, in which.

Figure 1:
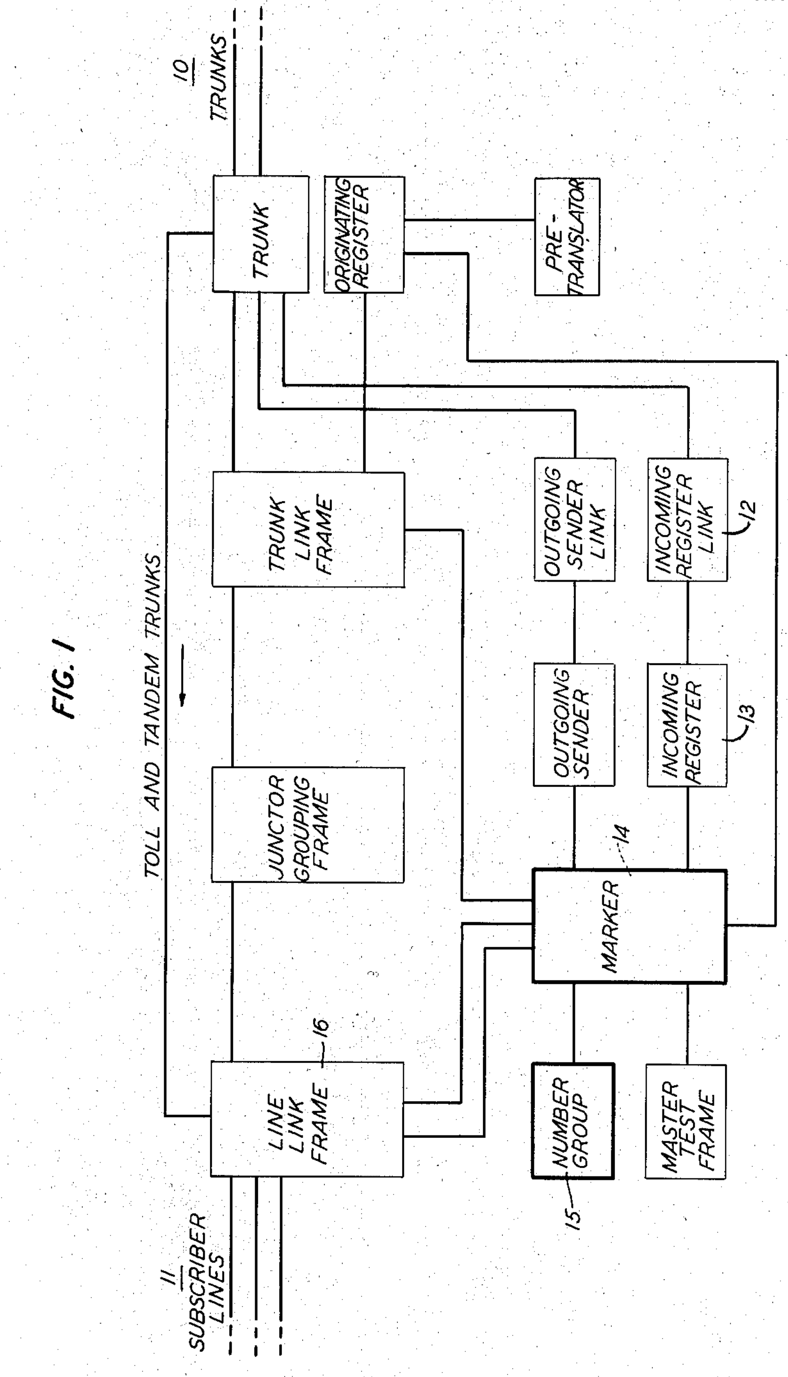
FIG. 1 is an overall block schematic diagram of a telephone system in which the present invention is incorporated.

Turning now to FIG. 1, there is depicted a broad block diagram of a well-known type of telephone system, commonly referred to as the No. 5 Crossbar System. Such systems are well known and have been in widespread use in this country for many years. The block diagram is largely self-explanatory and we need emphasize only a few aspects thereof for an appreciation of how our present invention may be incorporated in such systems.

In such systems, incoming calls are received over trunks 10 for connection to subscriber lines 11. In setting up such connections the dialed directory number is received over a trunk 10 and registered, via the incoming register link 12 in the incoming register 13. When the number, as dialed, is registered in register 13 it is necessary for the marker circuit 14 to obtain, from the number group circuit 15, the equipment location of the line-link frame 16 of the directory number presently stored in register 13.

The number group 15 is thus a large central file containing the latest directory number assignments, to which file the marker turns for the necessary information required. The number group circuit 15 also advises the marker the class of the called line and any necessary ringing information, such as for a party line.

Our invention is directed to the problem of adding to existing central offices of the type depicted in FIG. 1 a one-bit per subscriber line memory so that an additional item of information may be transmitted back to the marker circuit 14 when a call is placed towards a subscriber line 11. This additional information bit will indicate to the marker whether a special service, or special translation, is required on this incoming call. Such special services, per se, are beyond the scope of the present invention which is only to provide an indication to the marker, on a per line basis, that a special service is to be rendered on this call. Such a service may involve the automatic transfer of all calls to this particular directory number to a different number for a limited period of time; such automatic transfer circuitry is itself known. In accordance with our invention, however, an additional bit of memory may be added to the existing number group circuits 15 of certain telephone systems by utilizing existing leads and conductors in such number group circuits to provide the requisite memory for alerting the marker that this particular incoming call is not to be completed by normal translation in the number group circuit 15 of the called directory number.

In accordance with aspects of our invention, the added memory comprises nondestructively sensed magnetic core elements which, in the various embodiments set forth below, may be of two types, namely, a transfluxor or a core element dependent on shuttle flux for read-out and referred to herein as a shuttle-flux core. In these various embodiments, described further below, only the marker circuit 14 and the number group circuit 15, and interconnecting elements, of FIG. 1 need be considered; these elements have been depicted in darker outline in FIG. 1 and the embodiments depicted below are to be understood as incorporated in such circuits in that figure.

In order to understand clearly the specific operation of these various embodiments a brief summary of the transfluxor operation and a brief description of the shuttle-flux core at this point would be desirable before describing the operation of the various memory circuits in accordance with our invention.

Figure 3:
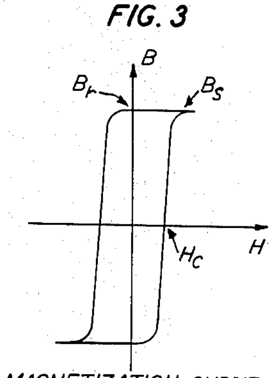
FIG. 3 is a magnetization curve for the transfluxor core of FIG. 2.
Figure 2:
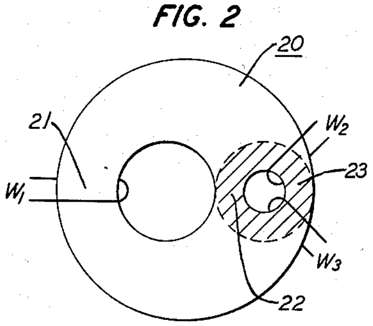
FIG. 2 is a schematic representation of a transfluxor magnetic core.

A transfluxor 20, as seen in FIG. 2 has two circular apertures which form three distinct legs, 21, 22 and 23, in the magnetic circuit, which apertures are of unequal diameters. The areas of the cross-sections of legs 22 and 23 are equal, and the cross-section of leg 21 is equal to or greater than the sum of those of legs 22 and 23. The transfluxor has a nearly rectangular hysteresis loop as shown in FIG. 3 and consequently a remanent magnetization, $B_r$, substantially equal to the saturation magnetization, $B_S$.

Figure 4A:
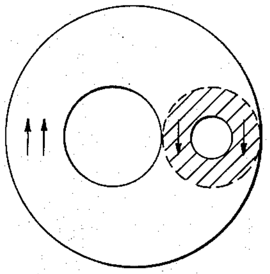
FIGS. 4A and 4B are representations of the transfluxor core of FIG. 2 depicting the two magnetization states thereof.

Assume that an intense current pulse is sent through winding $W_1$ on leg 21 in a direction to produce a clockwise flux flow which saturates legs 22 and 23. Leg 21 having a cross-section at least as great as the sum of those of legs 22 and 23 provides the necessary return path and is not necessarily saturated. Legs 22 and 23 will remain saturated after the termination of the pulse since remanent and saturation magnetizations are almost equal. Consider now the effect of alternating current in winding $W_2$, linking leg 23, producing an alternating magnetomotive force along a path, as shown in the shaded area of FIG. 2, surrounding the smaller aperture but of insufficient amplitude to produce flux change around the larger aperture. When this magnetomotive force has a clockwise sense it tends to produce an increase of flux in leg 23 and a decrease in leg 22. When it has a counterclockwise sense, it tends to produce an increase of flux in leg 22 and a decrease in leg 23. But in either case no increase in flux is possible in the leg whose remanent flux is in the direction of the magnetomotive force for the leg is already saturated. Consequently, there can be no flux change at all since magnetic flux flow is in closed paths. Flux flow is "blocked" during either cycle of the alternating current in winding $W_2$ as the result of the direction of saturation of either leg 22 or leg 23. The transfluxor is in its "blocked" state and no voltage is induced in output winding $W_3$ linking leg 23. This blocked state of the transfluxor in which no output is obtained is one of the two magnetization states of the device and is depicted in FIG. 4A.

Figure 4B:
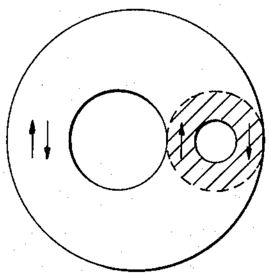

Consider now the effect of a current pulse through winding $W_1$ in a direction producing a counterclockwise nagnetomotive force after the "blocking" pulse has been applied. Let this pulse be intense enough to produce a magnetomotive force in the closer leg 22 larger than the coercive force, $H_c$, but not large enough to allow the magnetizing force in the more distant leg 23 to exceed this critical value. This "setting" pulse will cause the saturation of leg 22 to reverse and become directed upwards but will not effect leg 23 which will remain saturated downward. The core is now in the "unblocked" condition; this is depicted in FIG. 4B. The alternating current in winding $W_2$ will produce a flux reversal around the small aperture when the magnetomotive force is in the counterclockwise direction. The next half cycle, producing a magnetomotive force in the clockwise direction, causes the flux around the small aperture to switch once again. The flux around the small aperture continuously switches back and forth and induces an alternating voltage in winding $W_3$. Thus, in the second state of the device an alternating current on interrogation winding $W_2$ causes an alternating voltage in read-out winding $W_3$.

The read-out is nondestructive for the state of the core in the blocked condition does not change at all with the application of the interrogation current and in the unblocked state the flux around the small aperture may again be switched when a new interrogation current is applied, producing an output voltage on winding $W_3$, an indication that the core is in the "unblocked" condition. In the "unblocked" state it does not matter in which direction the flux around the small aperture remains after interrogation provided it is unidirectional.

Figure 6:
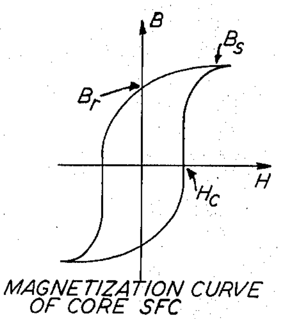
FIG. 6 is a magnetization curve for the shuttle-flux core of FIG. 5.
Figure 5:
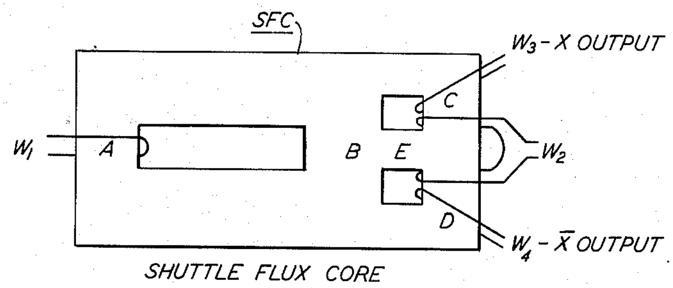
FIG. 5 is a schematic representation of a magnetic core utilizing shuttle flux effects for nondestructive read-out.

A shuttle-flux core SFC is depicted in FIG. 5 and its magnetization curve is shown in FIG. 6. Unlike that of the transfluxor, the magnetization curve of FIG. 6 exhibits a hysteresis curve whose remanent and saturated magnetizations are unequal. The shuttle flux of the magnetic material occurring on excursion between $B_r$ and $B_s$ is made use of in this one-bit element.

The set winding $W_1$ sets the structure into either of its two states upon the application of different polarity current pulses. The applied magnetomotive force, 5 ampere-turns for the particular core utilized in the illustrative embodiments allows rungs B, C and D to be saturated into either the up or down direction and rung E to be left neutral. We shall call the condition X for rungs B, C and D saturated down and $\overline{X}$ for rungs B, C and D saturated up.

The interrogation winding $W_2$ is placed around rung C to cause it to drive up and around rung D to cause it to drive down upon the application of an interrogation pulse. This is the same as having an interrogation winding around rung E which drives to the right. The output windings $W_3$ and $W_4$ sense the switching of rungs C and D, respectively.

Consider the X condition to be set into the core. This saturates rungs B, C and D down. When the interrogation pulse producing a magnetomotive force (one ampere-turn in the particular core utilized in this invention) is applied, rung C is driven up and rung D down. A switching voltage will appear on winding $W_3$ because the flux through this winding has reversed direction. Only a shuttle voltage will appear on winding $W_4$ because the flux in rung D has merely increased from a value of $B_r$ to $B_s$. If windings $W_3$ and $W_4$ are connected in series, the two flux changes in rungs C and D produce induced voltages of opposite polarities in the output winding. The pulse magnitude on $W_3$ is greater than that on $W_4$ due to the larger flux change in rung C than in rung D. Consequently, the interrogation pulse produces a pulse in the output winding of a first polarity if the core is set in the X condition.

It should be noted that the total flux in rung B increases during the interrogation operation. The interrogation magnetomotive force produces a counterclockwise flux around the upper aperture. This causes a reversal of flux in rung C and a large increase of flux in rung B. The interrogation magnetomotive force produces only a small shuttle flux change in the clockwise direction around the lower aperture. This increases the flux in rung D slightly and reduces the flux in rung B by a corresponding slight amount. Thus, the total flux in rung B increases. This is possible due to the fact that the saturated flux $B_s$ is greater than the remanent flux $B_r$ as evidenced by the magnetization curve of the shuttle-flux core. Upon the release of the interrogation pulse both rungs C and D return to their original conditions due to the unaffected flux around the large aperture and the X state of the core has been read-out nondestructively.

If the $\overline{X}$ state is set into structure, the application of an interrogation pulse causes the flux in rung D to switch and that in rung C to increase only slightly. The resultant pulse polarity on the serially connected windings $W_3$ and $W_4$ is of the opposite polarity to that of the pulse obtained upon interrogation of the core when set in the X condition.

The interrogation pulse has been described as causing rung C to drive up and rung D to drive down. In the X state the pulse magnitude on winding $W_3$ is greater than that on winding $W_4$ causing a resultant pulse of a particular polarity to appear across the serially connected windings. Obviously, if the interrogation pulse is of the opposite polarity, the opposite polarity resultant pulse will be obtained if the core is in the X state. In the two embodiments of this invention utilizing shuttle-flux cores, windings $W_3$ and $W_4$ are connected in such a manner that a positive interrogation pulse produces a positive output pulse if the core is in the X state. Similarly, a negative interrogation pulse produces a negative output pulse if the core is in the X condition. In the $\overline{X}$ state, a positive interrogation pulse produces a negative output pulse while a negative interrogation pulse produces the opposite polarity output pulse.

If instead of an interrogation pulse an alternating voltage is applied to winding $W_2$, it is seen that in the X state the induced alternating output voltage is in phase with the interrogation alternating waveform. In the $\overline{X}$ condition the output is 180 degrees out of phase with the interrogation waveform. Thus, the state of the core may be determined by comparing the relative phases of the interrogation and output waveforms.

Figure 7:
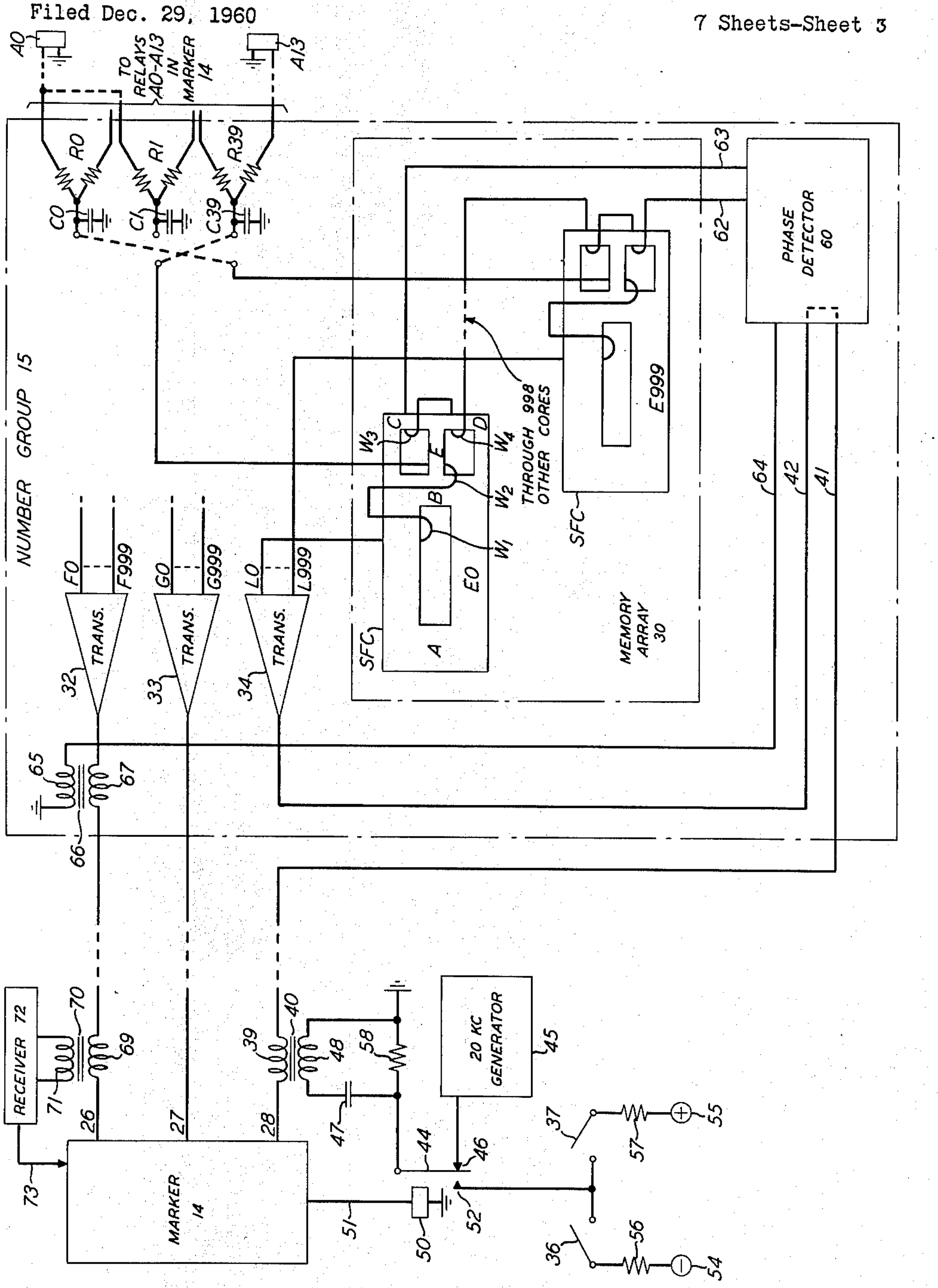
FIGS. 7 and 8 are schematic diagrams illustrating two embodiments of our invention incorporating shuttle-flux cores as depicted in FIG. 5.

Turning now to FIG. 7, there is disclosed one embodiment of our invention incorporating shuttle-flux core elements SFC. In present day No. 5 crossbar central offices the marker 14, through conductors 26, 27 and 28, places a potential on the proper directory number terminals of the number group 15. Each number group in the central office serves one thousand subscribers. For each call to a particular subscriber, the translators 32, 33 and 34 place the marker's potential on an individual lead in each of the F, G and L groups of one thousand conductors each. The additional circuitry in the figure are the means whereby the state of the core in memory array 30 associated with a particular subscriber may be read by marker 14 or set by switches 36 and 37.

Each of the L leads in present day No. 5 crossbar offices is connected to two of relays A0–A13 which designate the subscriber's line link frame. In accordance with our invention these L leads are passed through the respective SFC cores E0–E999 before being connected to the respective relays. The L leads, shown only for the respective cores E0 and E999, serve as both the setting and the interrogation windings. Thus, each L winding, as shown, includes in a series connection the windings $W_1$ and $W_2$ in FIG. 5.

Suppose that a setting magnetomotive force of 5 ampere-turns is applied producing a flux in rung A in the clockwise direction. Due to winding $W_1$ a flux is produced in rungs B, C and D in the downward direction. However, due to the series connection of windings $W_1$ and $W_2$ in the L lead, a magnetomotive force is also applied to rung E. This causes a clockwise flux around the upper aperture and a counterclockwise flux around the lower apetrure. These two fluxes are equal and consequently the total flux in rung B is the same as though no magnetomotive force were applied to rung E. The total magnetomotive force in the series path comprising rungs C and D due to that part of the winding equivalent to winding $W_2$ in FIG. 5 is similarly zero because the two fluxes are in opposite directions. A total downward flux due to winding $W_1$ is obtained in both rung B and the series path comprising rungs C and D. When the setting pulse is removed, it is seen that there is a remanent flux in the clockwise direction around the large aperture. There is similarly a flux in the downward direction in rungs B, C and D. Thus, at the end of the setting pulse the core is in the X state. The setting of the core in the state $\overline{X}$ is achieved in a similar manner upon the application of an opposite polarity pulse to the particular L winding.

The particular polarity setting pulse is obtained in the following manner. Conductor 28 from the marker is connected to the secondary coil 39 of transformer 40 which is connected to conductor 41. This conductor passes through phase detector 60 and is serially connected to conductor 42 which in turn is connected to the input terminal of translator 34. Armature 44 normally connects generator 45 through contact 46 and capacitor 47 to the primary 48 of transformer 40. When it is desired to set a particular core the marker 14 initiates the sequence of operations for completing a call to the particular subscriber. This sequence of operations normally results in a potential being applied to particular F, G and L leads which in turn are connected to the several distinct relays. (In the figure, only the L leads are shown connected to their respective relays, A0–A13. The F and G leads are similarly connected to corresponding relays.) Because it is desired to set the core rather than to complete the fictitious call to the subscriber, relay 50 is energized by marker 14 through conductor 51 immediately after the particular F, G and L leads have been chosen. This relay connects armature 44 to contact 52. If either switch 36 or 37 is now operated, a negative potential 54 or a positive potential 55 is applied through respective resistors 56 and 47, armature 44 and capacitor 47 to primary 48. A pulse of current results with an induced current pulse in secondary 39 which flows through the particular L lead chosen and sets the desired core in a state depending on which of switches 36 and 37 is operated.

This setting current is large in magnitude and should not be applied for a time greater than that time required to set the core. Capacitor 47 is included in the charging path to block this current after a few microseconds. Thereafter, when the particular switch 36 or 37 is released, capacitor 47 discharges through resistor 58 and primary 48. Resistance 58 is large in magnitude so that the current through primary 48 during discharge is small. The induced current in secondary 39 and the particular L lead is correspondingly small and does not affect the state of the particular core previously set.

The current from source 54 or 55 flows through respective resistors 56 or 57, capacitor 47 and primary 48 to ground. Resistors 56 and 57 are so chosen that ringing does not occur in this RLC path. Resistor 58 being high in value draws little current.

The large setting currents should not flow through the particular two of relays A0–A13 for this current may exceed the current rating of the relay coils. Capacitors C0–C39 short out the setting current pulse to ground. In normal operation, when it is desired to complete the call and energize two of relays A0–A13, the marker potential applied to conductor 28 is transmitted through the particular L lead and the particular resistor R0–R39 to the appropriate relay coils. This current is applied for a greater length of time than the setting pulse current and consequently while the particular capacitor of capacitors C0–C39 shorts out the initial marker current, as it charges, the marker current is diverted to the appropriate relay coils.

The output windings each comprising the series connection of windings $W_3$ and $W_4$ of a particular core are all connected in series by conductors 62 and 63. When a particular subscriber is being called, it has already been shown that a particular L lead is connected through translator 34 to secondary 39. In the normal condition generator 45 is connected through contact 46, armature 44 and capacitor 47 to primary 48. Thus, a continuing 20-kilocycle alternating-current waveform is induced in secondary 39. This waveform passes through phase detector 60 via conductors 41 and 42 and is applied to the particular L lead. The particular capacitor C0–C39 shorts this alternating current to ground. This is the interrogation waveform and the magnetomotive force produced in the selected core is approximately 1 ampere-turn on both windings $W_1$ and $W_2$. Due to the large path around the large aperture of the core SFC, a magnetomotive force of one ampere-turn on winding $W_1$ is insufficient for switching the state of the core represented by the direction of flux around the large aperture. However, this magnetomotive force on winding $W_2$ is sufficient for producing the required flux changes around the two smaller apertures. As described above, the flux change about the two smaller apertures produces an output waveform that is either in phase or 180 degrees out of phase with the interrogation waveform depending upon the state of the core. This output waveform, induced by flux reversals in only that particular subscriber's core through which the selected L lead passes, is compared in phase detector 60 to the interrogation waveform in conductors 41 and 42. If the phases are equal, indicating an X state in the chosen core, an output pulse is applied to conductor 64. This conductor is connected to ground through primary 65 of transformer 66. A voltage is induced in secondary 67 which causes current flow through primary 69 of transformer 70. Secondary 71 of transformer 70 has a corresponding voltage induced in it, receiver 72 is alerted that the particular core is in the X state and marker 14 is notified of this condition via conductor 73. If the X state indicates that the particular service is to be provided, the marker initiates the necessary sequence of operations. The absence of this pulse is an indication that the particular core is in the $\overline{X}$ state.

The reason for utilizing transformers 66 and 70 for transmitting the output pulse on conductor 64 to receiver 72 lies in the fact that the marker 14 may be situated at a great disance from number group 15. The use of these two transformers permits the utilization of conductor 26 which is already present in the central office.

It is seen that in this embodiment, a one-bit memory array is provided for the central office of a telephone system wherein a minimum of additional circuitry is required. Existing circuits are utilized for access purposes and only one access circuit is required. This is due to the fact that the set and interrogate windings are connected in series and the same L lead is chosen for both read and write operations. A large current of a particular polartiy sets the core. A smaller current interrogates it nondestructively.

If desired, the transformer 40 may be advantageously provided with a coil 39 of high inductance. This high inductance causes the direct current supplied by marker 14 to conductor 28 to build up slowly to the maximum value. In contrast, the alternating waveform is applied continuously to secondary 39 and immediately upon connection of the particular L lead to this coil through translator 34 by marker 14 an alternating current flows through this L lead. Switching in legs C and D takes place before the direct current builds up to its maximum value. This causes an induced alternating current in conductors 62 and 63 with the appropriate potential being applied to conductor 64. Receiver 72 detects the state of the call selected and notifies marker 14 whether or not the particular service is to be provided for the called party. The direct current then builds up to its maximum value and operates the appropriate relay associated with the L leads. When this maximum value is obtained, interrogation switching in the particular core chosen may be inhibited due to the saturating flux caused by the direct magnetomotive force applied to leg E. Even if this occurs, however, depending on the relative magnitudes of the direct and alternating potentials applied to lead L, however, the marker has already obtained the necessary information regarding the state of the core. Optionally, marker 14 may delay connection of direct current to lead 28 until interrogation has been completed.

It is to be noted that in the embodiment of FIG. 7, the high frequency generator 45 is placed at the marker end of the circuit. It might be desirable not to transmit this high frequency along conductor 28 all the way from marker 14 to number group 15. In accordance with the illustrative embodiment of our invention depicted in FIG. 8, the second of the two embodiments utilizing shuttle-flux cores, generator 45 may be placed in the number group 15 rather than in that part of the central office occupied by the marker.

Figure 8:
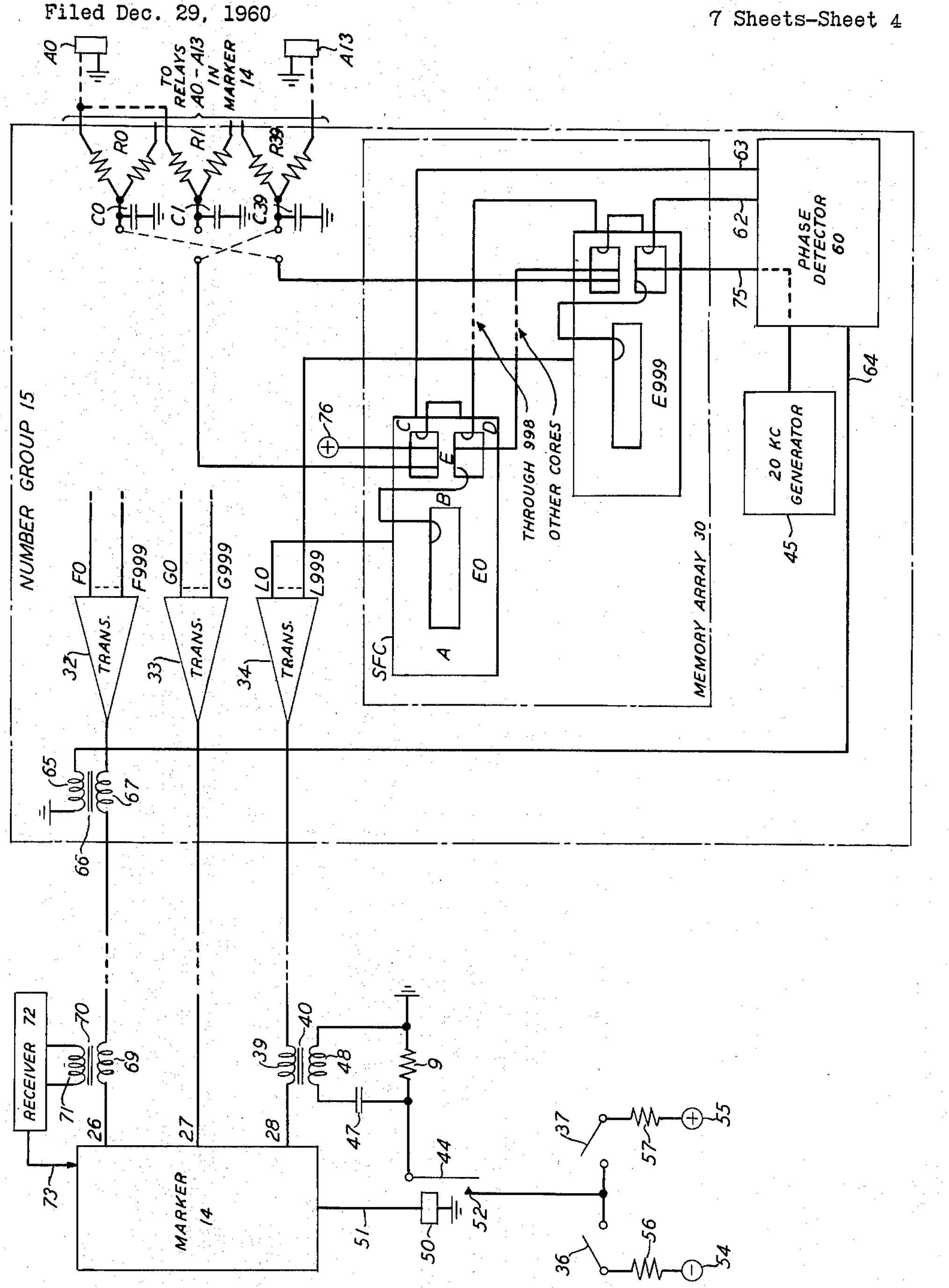

In FIG. 8 generator 45 is placed proximate to phase detector 60. Conductor 28 from marker 14 connected through primary 39 directly to translator 34, no longer passes through phase detector 60, and does not carry the 20 kc. waveform that is used in FIG. 7 for both interrogation of the cores and as the reference waveform for phase detector 60. This conductor transmits only the setting pulses, which are obtained in the same manner as in FIG. 7 when relay 50 is energized, and the marker current for energizing relays A0–A13.

Generator 45 serves the same two functions as in FIG. 7. It supplies the interrogation waveform and the reference phase for phase detector 60. Conductor 75, which is connected to the output of generator 45, passes not only through phase detector 60, but through each of the 1,000 cores in memory array 30 as shown in the figure. This conductor passes through each of the two small apertures in every core and is terminated at positive potential 76.

The setting of each core is accomplished in the same manner as in FIG. 7. Marker 14 initiates a fictitious call to the subscriber whose core is to be set, relay 50 is energized, the appropriate switch 36 or 37 is operated and the large setting magnetomotive force of 5 ampere-turns is applied to the appropriate core. Marker 14, instead of proceeding to complete the fictitious call by next applying currents to the three particular relays selected by translators 32, 33, and 34, disconnects itself from the translators and proceeds to accept a new call in the normal manner.

The interrogation waveform is continuously applied to each of the 1,000 cores. Conductor 75 passes through the smaller apertures of each core in the same manner that conductors L0–L999 pass through the two smaller apertures of the appropriate cores. Thus, the interrogation magnetomotive force which in FIG. 7 is applied to leg E by a particular one of conductors L0–L999 is now applied by conductor 75. Instead of the interrogation waveform being applied to one particular core only upon the operation of translator 34 by marker 14, the interrogation waveform is applied to all of the cores continuously. However, the interrogation waveform by itself does not switch any core because of potential 76.

Potential 76 causes a continuously flowing direct current through conductor 75. This current causes a saturation flux around the upper aperture of each core in a clockwise direction, and around the lower aperture in a counterclockwise direction. This continuously flowing current has no affect on the state of each core. The total current flowing through the outer perimeter of each core due to potential 76 is zero because, as far as the outer perimeter of the core is concerned, equal currents flow in both directions through the center of the core. Thus, there is no net magnetomotive force to affect the flux in leg A.

This continuously flowing current, however, does cause saturation in leg E of each core in a direction from right to left. The magnitude of the direct current from potential 76 is great enough so that the alternating current supplied by generator 45 has an amplitude insufficient in magnitude to switch the flux in leg E in every core. When the alternating current is in the same direction as the direct current, switching around the smaller apertures cannot take place because a saturated condition in the direction of the magnetomotive force applied to leg E is already present. When the alternating current is in a direction opposite to that of the direct current, the net current is stil large enough so that the coercive force, $H_c$, of the cores is not exceeded. Consequently, due to the saturation of leg E by potential 76, switching of the flux in legs C and D does not occur no matter in which direction the alternating current flows.

How then does interrogation of a particular core take place It has already been described that marker 14, in the normal process of completing any call, applies a positive potential to each of conductors 26, 27, and 28. These potentials cause currents to flow through particular F, G, and L leads to three particular pairs of relays. (Only the relays associated with the L leads are shown in the figure.) A current thus flows through only one particular L lead and, as seen in the figure, passes through the two smaller apertures of one particular core in a direction opposing the direct current supplied by potential 76. These two currents are equal in magnitude and the net direct magnetomotive force applied to leg E of the one particular core chosen is zero. Thus, the alternating current can cause flux reversals around the two small apertures of the particular core selected. As in FIG. 7, these flux reversals cause an alternating current to flow in conductors 62 and 63 whose phase is compared to the phase of the 20 kc. waveform of generator 45 in phase detector 60. As in FIG. 7, the relative phases of these two waveforms determine the state of the particular core interrogated, and the appropriate potential is applied to conductor 64. Receiver 72 detects this potential and notifies marker 14 via conductor 73 whether or not the particular called party is to be provided with the special service represented by memory array 30.

Figure 9:
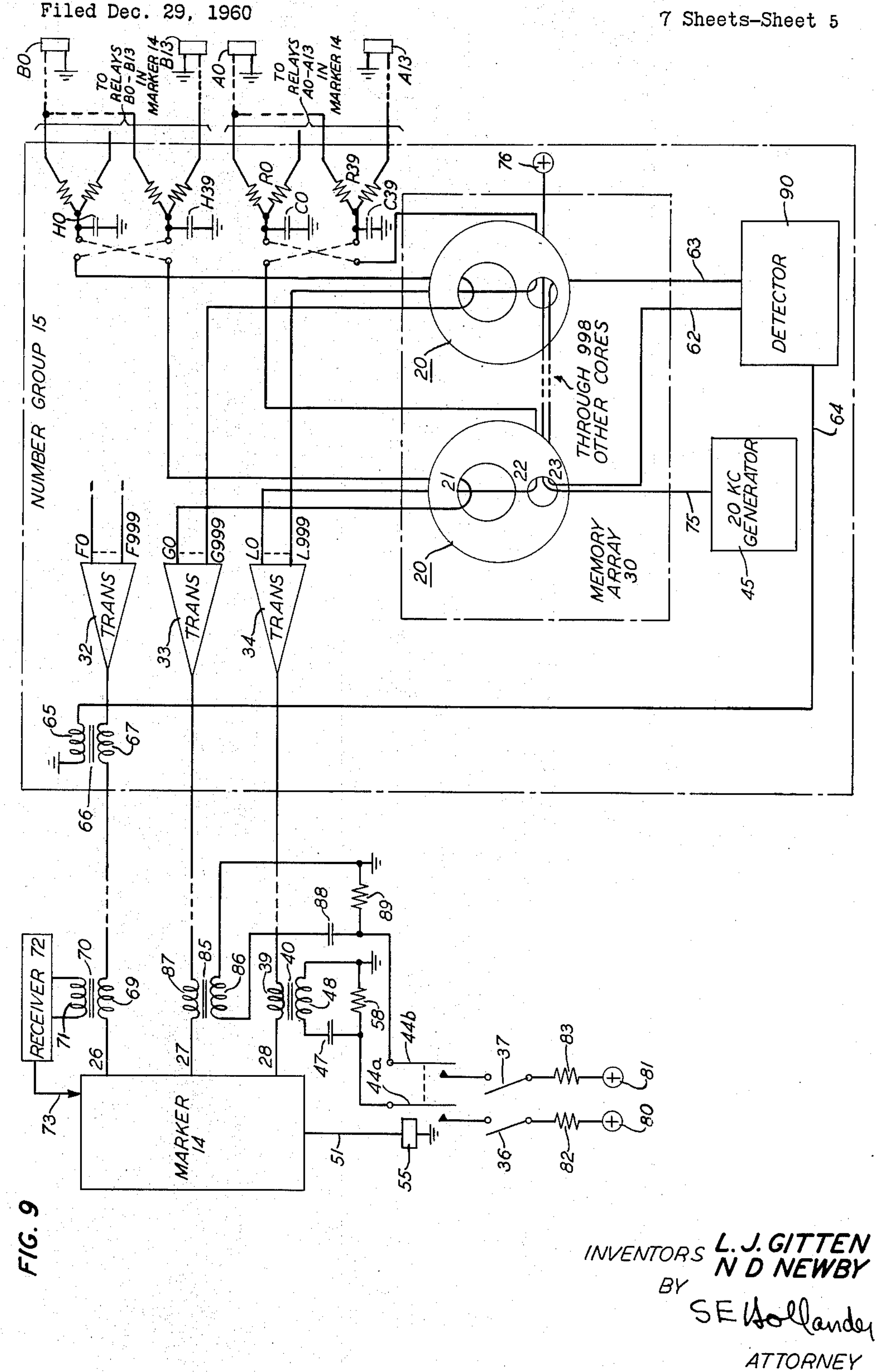
FIGS. 9, 10, and 11 are schematic diagrams illustrating three additional embodiments of our invention incorporating transfluxor cores as depicted in FIG. 2.

FIG. 9 is the first of the three embodiments utilizing transfluxor elements 20. As described above, two pulses are normally required to set the transfluxor in the desired state. The first of these is the blocking pulse and saturates the three legs. In FIG. 4A the blocked transfluxor is shown as having the flux in the clockwise direction. Thereafter a setting pulse may be applied which reverses the flux only around the larger aperture to set the element in the unblocked condition. If the setting pulse is not applied, the transfluxor remains in the blocked state.

In FIG. 9 the setting of any individual element is initiated by utilizing the particular G lead, and if necessary, the particular L lead. When it is desired to set the core, as in the previous figures, the marker initiates a fictitious call to the subscriber. This causes transators 32, 33, and 34 to choose particular F, G, and L leads. These three leads in present-day offices are cross connected to specific relays. In FIG. 9 two L leads are shown each connected to two of the A0–A13 relays after passing through the memory array 30. Similarly, two of the G leads are shown each connected to two of the B0–B13 relays. The G leads are utilized for applying the blocking pulse to the transfluxor elements. The L leads are utilized for both applying the setting pulse, if it is required, and for interrogation purposes.

When it is desired to set a particular core, marker 14 causes translators 33 and 34 to choose the appropriate G and L leads. Thereafter relay 55 is energized, and armatures 44*a* and 44*b* are closed. The blocking and setting pulses are applied to conductors 27 and 28, respectively, in a similar manner as in the previous two figures. When switch 36 is closed, current from positive source 80 flows through resistor 82, switch 36, armature 44*a*, capacitor 47, and primary 48 to ground. As in the previous figures, capacitor 47 charges and this current pulse is terminated. The current pulse induced in secondary 39 causes current flow in the appropriate L lead. When switch 36 is released, capacitor 47 discharges through resistor 58 and primary 48. Similarly, the blocking pulse is induced in the appropriate G lead by the operation of switch 37 prior to switch 36. Transformer 85, with primary 86 and secondary 87 performs the same function as transformer 40 with primary 48 and secondary 39. Capacitor 88 is analogous to capacitor 47 as is resistor 89 to resistor 58. Similar remarks apply to resistors 82 and 83.

When a particular core is to be set, the blocking pulse is first applied through the G lead. The blocking pulse consists of positive current flowing from secondary 87 towards the particular B0–B13 relays associated with G leads. This current causes the flux in the selected core to be set in the clockwise direction, the blocked state. Immediately thereafter, switch 36 is operated if the core is to be set in the unblocked condition. Current flows from secondary 39 towards the appropriate relays and causes the flux to reverse around the large aperture of the selected core.

Unlike conventional transfluxor configurations, the setting lead in accordance with this embodiment of our invention, passes through the smaller aperture as well as the larger aperture. This is necessary for interrogation purposes, but at the same time affords an added advantage in the setting operation. Normally, the tolerance of the setting pulse is very close. It must be of sufficient magnitude to cause a flux reversal around the larger aperture, but at the same time care must be taken to insure that this pulse is of insufficient magnitude to cause a flux reversal in leg 23 as well. Were leg 23 to be switched as well as leg 22, the transfluxor would be placed in a blocked condition with the flux in the counterclockwise rather than in the clockwise direction, instead of an unblocked condition. In the present case, however, it will be observed that the setting current produces a magnetomotive force in leg 23 in the clockwise direction because it passes through the small aperture of the core and thus aids the flux in leg 23. There is no danger of the flux reversing in this leg no matter how large the magnitude of the pulse.

For setting a core in the blocked condition only switch 37 need be operated. If the unblocked state is desired, switch 36 must then be operated. It should be noted that due to the fact that the setting winding passes through the small aperture as well as the large, it is not even necessary to first apply a blocking pulse when it is desired to set the core in the unblocked state as in conventional applications. The setting pulse alone is sufficient. A large setting pulse produces a counterclockwise flux around the large aperture and a clockwise flux around the small aperture. This results in a unidirectional flux around the small aperture which satisfies the unblocked condition.

Capacitors H0–H39 serve the same purpose as capacitors C0–C39, priorly discussed, that is, they short out the large blocking pulse to ground so that these pulses do not damage relays B0–B13.

As in FIG. 8, generator 45 is placed in number group 15. Conductor 75 connects generator 45 to positive source 76 and passes through the smaller aperture of all cores in memory array 30. In the absence of source 76, the alternating waveform applied to conductor 75 would have the same effect on each of the cores in memory array 30 as would an alternating current applied to winding $W_2$ of the transfluxor core in FIG. 2. This alternating waveform would continuously reverse the directions of flux around the small apertures of those cores in the array that have been set in the unblocked condition.

However, source 76 supplies a continuous direct current through all of the small apertures. The direction of this current provides a magnetomotive force in the counterclockwise direction. Referring to the blocked transfluxors of FIG. 4A it is seen that this current does not affect the state of the core. A magnetomotive force in the counterclockwise direction that tends to produce a flux increase in the counterclockwise direction must necessarily cause this flux to flow through leg 22. But this leg is already saturated, and flux through it cannot increase.

Thus, source 76 does not affect the state of any core in the array. However, it does inhibit the flux reversals around the small apertures of the cores by interrogation generator 45. As in FIG. 8, the amplitude of the interrogation current waveform is of such a value that the difference between it and the direct current from source 76 is a net value which is of insufficient magnitude to cause the magnetomotive force to exceed the coercive force, $H_c$, thereby inhibiting the fluxes around the small apertures of the unblocked cores for switching.

When a particular core is to be interrogated, the marker 14, after selecting the particular L lead through translator 34, supplies a direct current through this lead directed toward the appropriate one of relays A0–A13. This current produces a magnetomotive force that opposes the inhibiting magnetomotive force produced by the direct current from source 76. Thus, the interrogation generator 45 can cause a flux reversal in the particular element selected by marker 14 if that element is in the unblocked condition. Conductors 62 and 63 pass through the small apertures of every core in the array and serve the same function as winding $W_3$ in FIG. 2. If the particular core selected is in the unblocked condition, an induced alternating current appears in these conductors. Detector 90 detects the presence or absence of this current and a signal is placed on conductor 64 which, through transformers 66 and 70, alerts receiver 72 as to the state of the core of the called party. Detector 90 is no longer a phase detector as in the two embodiments utilizing shuttle-flux cores because to determine the state of the transfluxor it is merely necessary to detect the presence or absence of an induced current in the output winding, not its phase.

Figure 10:
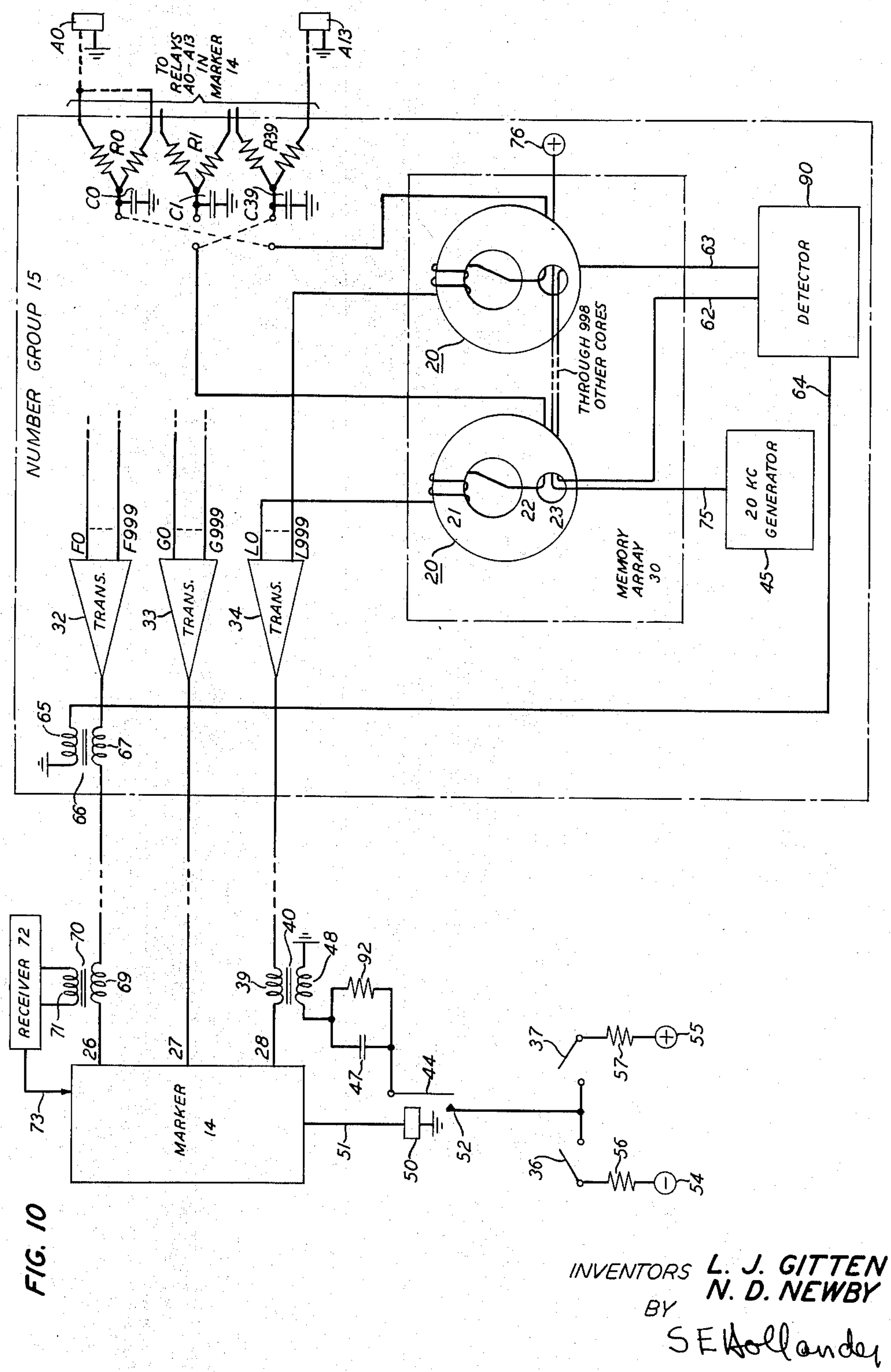
Figure 11:
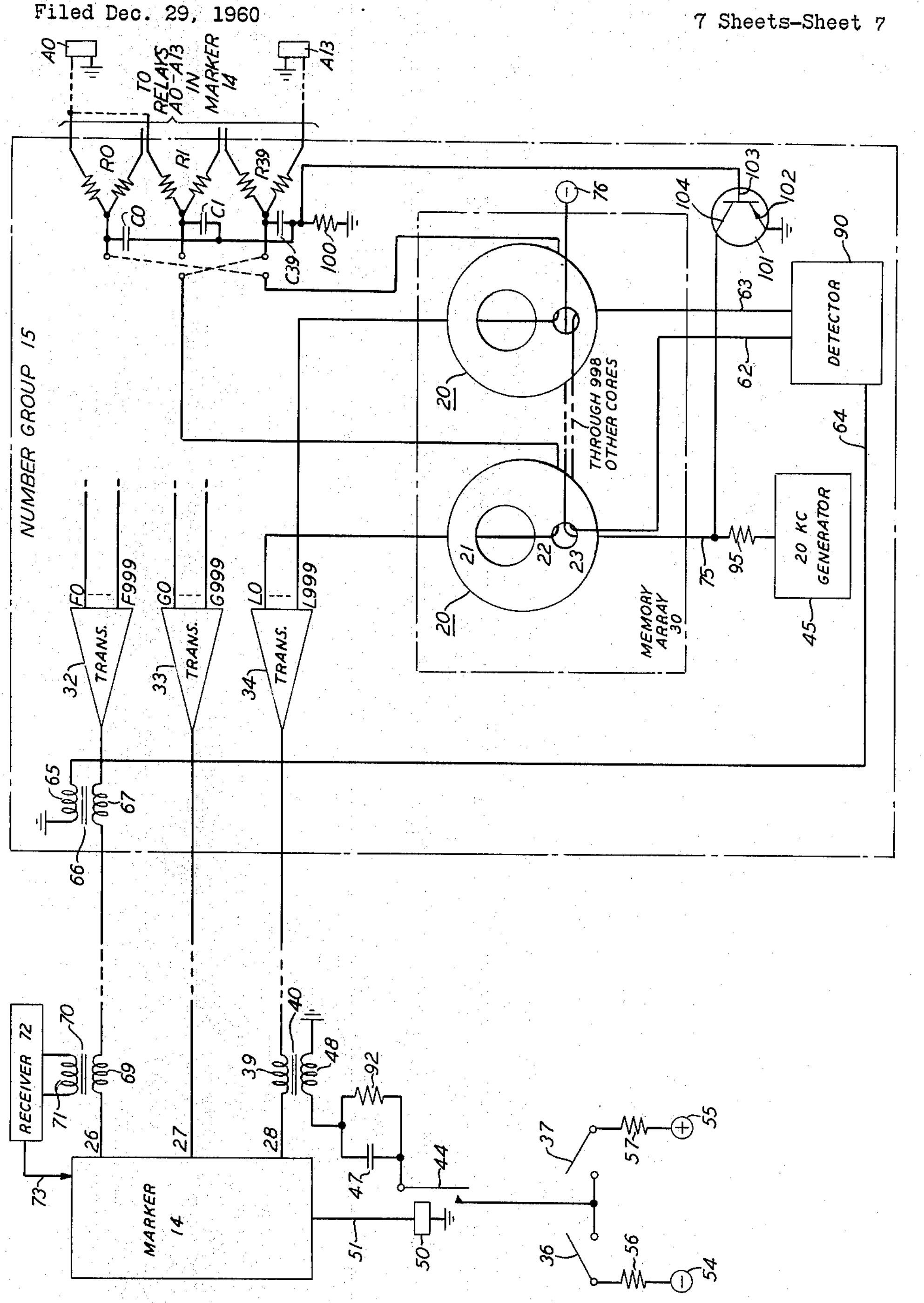

In FIG. 9, while a minimum of additional equipment is required to set and interrogate the cores of memory array 30, it is seen that two access circuits are required. This is due to the fact that while the L lead is used for both setting and interrogating, a G lead is required to block the core if the core is to be placed in the blocked condition. FIGS. 10 and 11 depict embodiments in which the G lead windings are eliminated, and, instead an appropriate current on the L leads serves to block the cores as well as set and interrogate them.

It is not possible to block a core in FIG. 9 by applying a large magnetomotive force whose direction is opposite to that of the setting pulse to the particular L lead winding. In the blocking operation flux must flow in a clockwise direction in all legs. In FIG. 9, this condition is achieved because the blocking lead G passes only through the large aperture, and a large current pulse results in the desired flux direction. One of the advantages of the arrangement of FIG. 9 is that there is no upper limit to the magnitude of the setting pulse. A large setting pulse results in a zero total current flowing inside the outer perimeter of the core, and consequently, the fluxes around the two apertures are in opposite directions. Thus, if a pulse of the opposite polarity were to be applied to the L lead to block the core, the net magnetomotive force in the outer perimeter must still be zero. All of the flux would not assume a clockwise direction as desired in the blocked state. Specifically, the flux in leg 23 would be in the wrong direction. A unidirectional flux around the small aperture would result and the core would effectively be unblocked. If the G lead is to be eliminated and the blocking as well as the setting pulse is to be applied to the L lead, some method must be devised to provide an additional clockwise magnetomotive force to leg 23 during the blocking operation.

In FIG. 10 positive or negative potential may be applied to the input of translator 34. The circuit operates similarly to that of FIG. 7. When it is desired to block or set the core, relay 50 is energized and causes armature 44 to be connected to contact 52. The operation of either keys 36 or 37 causes a negative or positive current flow through resistors 56 or 57, capacitor 47 and primary 48. Capacitor 47 is included in the circuit for the same reason as in FIG. 7, that is, to stop current flow after it charges so that the blocking and setting pulses are applied for only that time necessary to switch the core. When the capacitor charges, current flows through resistor 92 and primary 48. However, this resistor 92 is large in magnitude, and the induced current in secondary 39 is of such a small value as to have no effect on the core. When keys 35 and 37 are released, capacitor 47 discharges through resistor 92. It is to be noted that in FIG. 10 resistor 92 is connected to the junction of capacitor 47 and primary 48 rather than to ground, as resistor 58 in FIG. 7. Either connection would provide an operative circuit in all embodiments of the invention.

When it is desired to block a particular core, a negative current pulse flowing toward translator 34 and through the particular L lead causes a clockwise magnetomotive force in legs 21, 22, and 23 due to the multiturn windings on leg 21. This same current causes a counterclockwise magnetomotive force around the small aperture due to the winding on leg 22 tending to produce the wrong direction of flux in leg 23. The two magnetomotive forces thus tend to produce oppositely directed fluxes in leg 23. Because of the greater number of windings around leg 21, the magnetomotive force producing the clockwise direction of flux in leg 23 exceeds the magnetomotive force producing a counterclockwise flux direction in the same leg. Thus, the flux in leg 23 will assume a clockwise direction, and the transfluxor element assumes the blocked state.

If it is desired to set the element in the unblocked state, switch 37 is operated and a positive current pulse is directed through the L lead. In FIG. 9 there is no limit to the magnitude of the setting pulse. However, in the embodiment of FIG. 10 a large positive pulse will merely reverse the direction of all flux paths and a blocked transfluxor will be obtained with the flux in the counterclockwise rather than in the clockwise direction. This is a result of placing a greater number of turns on leg 21 than on leg 22. Thus, to properly set a core in FIG. 10, it is necessary to limit the magnitude of the magnetomotive force to that value which will switch the direction of flux around the larger aperture but which does not exceed the coercive force required to change the direction of flux around the longer path including leg 23.

The remainder of the operation of FIG. 10 is identical to that of FIG. 9. The switching of flux around the small aperture of all cores in the unblocked condition by generator 45 is inhibited by the direct current from source 76. When the direct current bias is canceled by the marker current applied to conductor 28 in the particular core chosen, generator 45 proceeds to cause an alternating flux around the small aperture. Detector 90 detects this condition, and as in the previous figures notifies receiver 72 as to the state of the selected core.

FIG. 11 represents another approach that can be used to enable a memory array of transfluxor elements to be operated from a single access circuit. As described above, it is necessary somehow to provide an additional magnetomotive force in the clockwise direction when blocking a core so that the total magnetomotive force in leg 23 will be in the clockwise direction. This was achieved in FIG. 10 by placing a greater number of turns on leg 21 than on leg 22. With this scheme it was seen that the advantage of FIG. 9 regarding the absence of an upper limit on the magnitude of the setting pulse could not be had. In FIG. 11, on the other hand, the L winding on each core is identical to that of FIG. 9. The setting operation is similarly identical to that of FIG. 9, and there is no upper limit on the magnitude of the setting pulse.

The additional clockwise magnetomotive force in leg 23 required for blocking the core is obtained by external means. An additional magnetomotive force is supplied to leg 23 during the duration of the blocking pulse. These external means are inactive during the setting operation, and do not affect the core at this time.

The blocking pulse consists of a negative current flowing through a particular L lead towards a particular pair of relays A0–A13. In the previous figures it was desired to provide a low impedance path to ground on the L leads in order to bypass both the blocking and setting pulses around the R0–R39 resistances and the A0–A13 relays. For this reason the shunt capacitors C0–C39 were added to the circuit. Capacitors C0–C39 are large compared to capacitor 47. Therefore, when capacitor 47 is fully charged during blocking or setting the voltage across the associated capacitors C0–C39 will be small and no appreciable current will flow through the connected relays during the duration of the pulse.

In FIG. 11 capacitors C0–C39 are connected to resistor 100 rather than to ground. Resistor 100 is very small (e.g., 3 ohms), and consequently the setting and blocking currents are still directed to ground rather than to the relays. Although resistor 100 is small in value, it must be remembered that the charging and blocking current pulse magnitudes are quite large. Consequently, the voltage drop across resistor 100 in both blocking and setting operations is of the order of magnitude of a few volts. During the blocking operation the junction of resistor 100 and capacitors C0–C39 is at a negative potential while in setting this junction assumes a positive potential.

This junction is connected to base 103 of p-n-p transistor 101. Emitter 102 of this transistor is grounded. Consequently, during the blocking operation the negative potential on base 103 forward biases transistor 101, and current flows from collector 104. During setting the emitter base junction is reverse biased, and collector current does not flow.

Thus, during blocking, current flows from collector 104 to conductor 75, this current passing through the small aperture of all cores in memory array 30 and bypassing resistor 95. This current tends to produce a clockwise magnetomotive force around the small apertures of all the cores. This magnetomotive force aids the ampere turns applied to leg 21 in causing the flux in leg 23 to assume a clockwise direction.

This additional flux has no effect on cores in the blocked condition for the same reason that the interrogation waveform does not cause flux reversals—the flux in a leg in the remanent condition is equal to the saturation flux and consequently no increase in flux is possible.

This magnetomotive force similarly has no effect on the cores in the unblocked condition (except, of course, the particular core to which the blocking current pulse is being applied) because in the unblocked condition it is merely necessary that the flux around the small aperture be in a clockwise or a counterclockwise direction, that is, the fluxes in legs 22 and 23 should not oppose each other. This additional magnetomotive force may merely cause the counterclockwise flux of an unblocked core, if this flux was counterclockwise rather than clockwise when the last interrogation pulse ended, to assume a clockwise direction. The core remains in an unblocked condition.

The magnitude of the current pulse applied by transistor 101 is bounded by a lower and an upper limit. The lower limit is, of course, due to the fact that a sufficient magnetomotive force must be applied to aid the flux in leg 23 to assume a clockwise direction. In so doing, however, this additional magnetomotive force causes the flux in leg 22 to assume a direction that opposes a clockwise direction around the larger aperture. Because in the blocked condition, it is necessary for all of the flux around the large aperture to be in a clockwise direction, the current magnitude must be limited to insure that the flux in leg 22 does not assume the wrong direction.

An added advantage of this configuration lies in the fact that during the blocking operation the interrogating current is short circuited through transistor 101 and is not applied to the conductor 75. The interrogating current thus can have no adverse effect on the blocking operation. Even if the blocking pulse is applied during that half cycle in which the interrogating current tends to cause the flux in leg 23 to assume a counterclockwise direction, thus opposing the blocking pulse and normally requiring a larger pulse, this current is diverted through transistor 101 and has no effect on the core.

It is thus seen that the embodiment of FIG. 11 as FIG. 10 requires only a single access circuit. The multiturn windings on each of the 1,000 cores of FIG. 10 are replaced in FIG. 11 by the addition of a single transistor circuit, with the added advantage that there is no limit to the magnitude of the setting pulse.

Accordingly, in each of these embodiments a nondestructively read magnetic core is provided in the number group circuit utilizing existing connections from the marker circuit for the provision of one-bit per subscriber line memory which may be interrogated by the marker during the normal operation and cooperation of the marker and number group circuits. Further, in certain of these embodiments, only a single access circuit need be provided for each core element for both setting and sensing nondestructively.

Although five specific embodiments of the invention have been shown and described, it will be understood that they are but illustrative and that various modifications may be made therein without departing from the spirit and scope of the invention.

What is claimed is:

1. A memory array comprising magnetic core elements having two stable remanent polarization states each of said elements having first, second and third apertures, an individual conductor coupled to said first, second, and third apertures of each of said cores, means including first current means connected to said conductors for setting said cores in either of said two remanent polarization states in accordance with the polarity of said first current, means including second current means connected to said conductors for reversing the polarization around only one of said second and third apertures of said cores in a manner determined by the remanent polarization states of said cores, read-out means coupled to said second and third apertures of each of said cores, and means for detecting the polarity of the current induced in said read-out means for determining the states of said cores.

2. A memory array comprising a plurality of two-faced magnetic cores having two stable remanent polarization states, each of said cores having first, second and third apertures, a first conductor individually associated with each of said cores, said conductor entering said first and third apertures on said first face and said second aperture on said second face, means for selectively applying a first current to said conductors for setting the remanent polarizations around said first apertures and around the outer perimeters of said cores in either clockwise or counterclockwise directions in accordance with the polarity of said first current, second conductor means passing through each of said second and third apertures, said second conductor means entering each of said apertures on the same face of said cores, means for applying a second current to said first conductors for reversing the polarization around only one of said second and third apertures in accordance with the directions of said remanent polarizations of said cores, and means for detecting the polarities of the induced currents in said second conductor means for determining which of said second or third aperture fluxes reversed.

3. A memory array in accordance with claim 2 wherein said second current is alternating, successively reversing the polarizations around said second and third apertures, and said detector means compares the phase of said induced current to the phase of said alternating current.

4. A memory array comprising a plurality of two-faced magnetic cores having two stable remanent polarization states, each of said cores having first, second and third apertures, a first conductor individually associated with each of said cores, said conductor entering said first and third apertures on said first face and said second aperture on said second face, means for selectively applying a first current to an individual one of said conductors for setting the remanent polarizations around said first apertures and around the outer perimeters of said cores in either clockwise or counterclockwise directions in accordance with the polarity of said first current, read-out conductor means passing through said second and third apertures in each of said cores, a common conductor passing through each of said second and third apertures, said common conductor entering said second and third apertures on opposite faces in each of said cores, alternating current means continuously connected to said common conductor for reversing the flux around only one of said second or third apertures in each of said cores in accordance with the directions of said remanent polarizations in said cores, direct current means continuously connected to said common conductor for inhibiting said alternating current means from reversing the flux in each of said cores, means for applying a second current to one of said first conductors for canceling the inhibiting effect of said direct current, and means for detecting the polarity of the induced current in said readout conductor means for determining the state of said core to which said second current is applied.

5. A memory array in accordance with claim 4 wherein said common conductor passes through each of said cores in an identical manner and said read-out conductor means consist of a single conductor entering each of said second and third apertures on the same face in each of said cores.

6. A memory array in accordance with claim 5 wherein said detector means includes means for comparing the relative phases of said alternating current and said induced current.

7. A memory array comprising a plurality of magnetic core elements having two stable remanent polarization states, each having first, second and third apertures, conductor means individually associated with each of said cores, said conductor means passing through said first, second and third apertures, first current means for setting said cores in one of said two remanent polarization states upon the application of first current pulses of a first magnitude to said conductor means, other conductor means passing through said second and third apertures of each of said cores, second current means connected to said other conductor means for causing polarization reversals around only one of said second or third apertures of each of said cores in a manner determined by the remanent polarization state of each of said cores, third current means connected to said other conductor means for inhibiting said polarization reversals, read-out conductor means connected through said second and third apertures of each of said cores, means for selectively applying a fourth current to said individual conductor means for overriding said inhibiting third current means, and means for detecting the induced current conditions in said read-out means responsive to said polarization reversals for determining the remanent polarization states of said cores.

8. A memory array comprising a plurality of magnetic cores, each of said cores having first and second apertures and first, second and third legs, said second leg separating said first and second apertures, individual conductors connected to each of said cores, said conductors being wound around said first legs a greater number of times than around said second legs, first current means selectably connectable to said conductors for setting oppositely directed unidirectional flux around said first and second apertures, second current means of opposite polarity and greater in magnitude than said first current means selectably connectable to said conductors for setting unidirectional flux in the two paths comprised by said first and second legs and said first and third legs, a first common conductor linking said second aperture of each of said cores, current means connected to said first common conductor for continuously reversing the flux around said second aperture of each of said cores having a unidirectional flux around said second aperture, direct current means connected to said first common conductor for inhibiting said reversals in said cores, a second common conductor linking each of said second apertures, a third current means selectably connectable to said individual conductors for canceling the inhibiting effect of said direct current, and means for detecting induced currents in said second common conductor in response to said flux reversals.

9. A one-bit memory array comprising a plurality of magnetic cores, each of said cores having first and second apertures and first, second and third legs, said second leg separating said first and second apertures, conductor means for applying magnetomotive forces to said first and second legs, the magnetomotive force applied to said first legs being greater than that applied to said second legs, means for applying pulses to said conductor means, means for selectively varying the magnitude of said pulses to set unidirectional or nonunidirectional fluxes around said second apertures, means including alternating current means for continuously reversing said unidirectional fluxes around said second apertures of said cores, means for inhibiting said flux reversals in said cores, means including current pulse means for applying a third current to said conductor means for opposing said inhibiting means, and means for detecting said flux reversals in said cores when said third current is applied.

10. A memory array comprising a plurality of magnetic cores, each of said cores having first and second apertures, conductor means individually coupled to said first and second apertures of said cores, means selectably connectable to said conductor means for applying current pulses of a first magnitude to set unidirectional flux around said first and second apertures, means selectably connectable to said conductor means for applying current pulses of a second magnitude to set unidirectional flux around only said first apertures, means coupled to said second apertures for reversing the fluxes around said second aperture of those cores set by said first current applying means, means for preventing said reversals, means selectably connectable to said conductor means for overcoming said preventing means, and detector means for detecting the presence of said flux reversals around said second apertures.

11. A memory array comprising a plurality of magnetic cores, each of said cores having first and second apertures, a respective conductor passing through said first and second apertures of each of said cores in opposite directions, first current pulse means for selectively applying first current pulses to said respective conductors for setting the fluxes around said first and second apertures in opposite directions, a common conductor through said second apertures of all said cores, means including current supplying means for applying current pulses selectively to said common conductor, second current pulse means for selectively applying second current pulses to said respective conductors to set unidirectional fluxes around said first apertures and to control said current supplying means, said current supplying means and said second current pulse means together setting nonunidirectional fluxes around said second aperture of said cores to which said second current pulses are applied, means for causing the fluxes around each of said second aperture of said cores set by said first current pulse means to reverse, means for inhibiting said reversals, third current pulse means for applying a third current pulse to one of said respective conductors for canceling the effect of said inhibiting means, and means for detecting said flux reversals around said second aperture of said cores to which said third current pulses are applied.

12. A memory array having a plurality of magnetic cores having first and second apertures, an individual conductor passing through said first and second apertures of each of said cores in opposite directions, a first common conductor passing through said second aperture of each of said cores in an opposite direction than said individual conductors, current supplying means connected to said first common conductor, first current pulse means for selectively applying first current pulses to said individual conductors for setting opposite unidirectional fluxes around said first and second apertures in said cores, second current pulse means for applying second current pulses to said individual conductors, said current supplying means responsive to said second current pulse means for applying currents to said first common conductor which in combination with said second current pulses sets the fluxes around said first aperture and around the outer perimeter of said cores to which said second current pulses are applied in the same direction, first current means connected to said first common conductor for reversing the fluxes around said second aperture of said cores whose fluxes have been set by said second current pulse means, second current means connected to said first common conductor for inhibiting said reversals, third current pulse means for selectively applying a third current pulse to said individual conductors for canceling the inhibiting effect of said second current means, a second common conductor passing through said second apertures of said cores, and means for detecting induced currents in said second common conductor in response to said flux reversals in said cores.

13. A memory array comprising a plurality of multi-apertured magnetic cores having stable states of magnetic remanence, means including a plurality of first conductors for determining the remanent flux in said cores, each one of said first conductors extending through all of said apertures of a respective one of said cores, and means for nondestructively sensing said cores, said sensing means including a common conductor extending through less than all of said apertures of all said cores, means for applying an alternating current to said common conductor, means for applying an inhibiting signal to said comon conductor, and means for selectively applying current to one of said first conductors to cancel the effect of said inhibiting signal at a selected one of said cores.

14. A memory array in accordance with claim 13, further comprising a third conductor extending through less than all the apertures of all of said cores, and detector means connected to said third conductor for detecting flux reversals in at least a portion of said selected one of said cores.

15. A memory array comprising a plurality of three-apertured magnetic cores having two stable states of magnetic remanence, means including a plurality of first windings extending through all of said apertures in each of said cores for determining the remanent flux in said cores, a common conductor extending through two apertures in all of said cores, means for reversing the flux around only one of said two apertures in accordance with the magnetic remanence in each of said cores, interrogation means for selectively initiating said flux reversals in said cores, and sensing means for detecting the induced current condition in said common conductor in response to said flux reversals.

16. A memory array comprising a plurality of two-apertured magnetic cores having two stable states of magnetic remanence, means including a plurality of first windings extending through both of said apertures in each of said cores for determining the remanent flux in said cores, a common conductor extending through one of said apertures in each of said cores, alternating current means connected to said common conductor for continuously reversing the flux around said ones of said apertures in said cores having a particular one of said two magnetic states, direct current means connected to said common conductor for preventing said reversals, current means selectively connectable to said first windings for overcoming said direct current preventing means, and means for detecting said flux reversals.

17. A single access magnetic memory comprising a plurality of multiaperture magnetic devices having remanent flux switching characteristics, the apertures of each of said devices defining therein a principal and at least one subsidiary flux path each exhibiting said flux switching characteristics, translator means, a source of flux-setting potentials, a source of flux-path-interrogating signals, a single conductor means respective to each one of said devices, said conductor means linking with each of said principal and said subsidiary flux paths thereof, and means including said translator means for selectively connecting said source of flux-setting potentials to any one of said single conductor means to selectively establish first and second fluxes in said principal flux path of the respective device and for selectively connecting said source of flux-path-interrogating signals to any one of said single conductor means to interrogate a subsidiary flux path of the respective device.

18. A single access magnetic memory in accordance with claim 17 wherein the flux-path-interrogating signal is a direct current and the flux-setting potentials are first and second opposite polarity potentials, and further including a common conductor coupled to all of the subsidiary flux paths in each of said multiaperture magnetic devices and means for applying an alternating current signal superimposed on a direct current signal to said common conductor.

19. A single access magnetic memory in accordance with claim 17 wherein the flux-path-interrogating signal is an alternating current signal superimposed on a direct current signal and the flux-setting-potentials are first and second opposite polarity potentials.

References Cited by the Examiner

UNITED STATES PATENTS

| | | | |
|---|---|---|---|
| 2,764,634 | 9/1956 | Brooks et al. | 139—18 |
| 2,904,636 | 9/1959 | Makim et al. | 139—18 |
| 2,967,294 | 1/1961 | Moerman | 340—174 |
| 2,969,524 | 1/1961 | Bennion | 340—174 |
| 2,983,906 | 5/1961 | Crane | 340—174 |
| 2,992,415 | 7/1961 | Baver | 340—174 |
| 3,044,044 | 7/1962 | Lee | 340—174 |
| 3,048,828 | 8/1962 | Cataldo | 340—174 |

IRVING L. SRAGOW, *Primary Examiner.*

L. MILLER ANDRUS, BERNARD KONICK, *Examiners.*